Patented Jan. 5, 1932

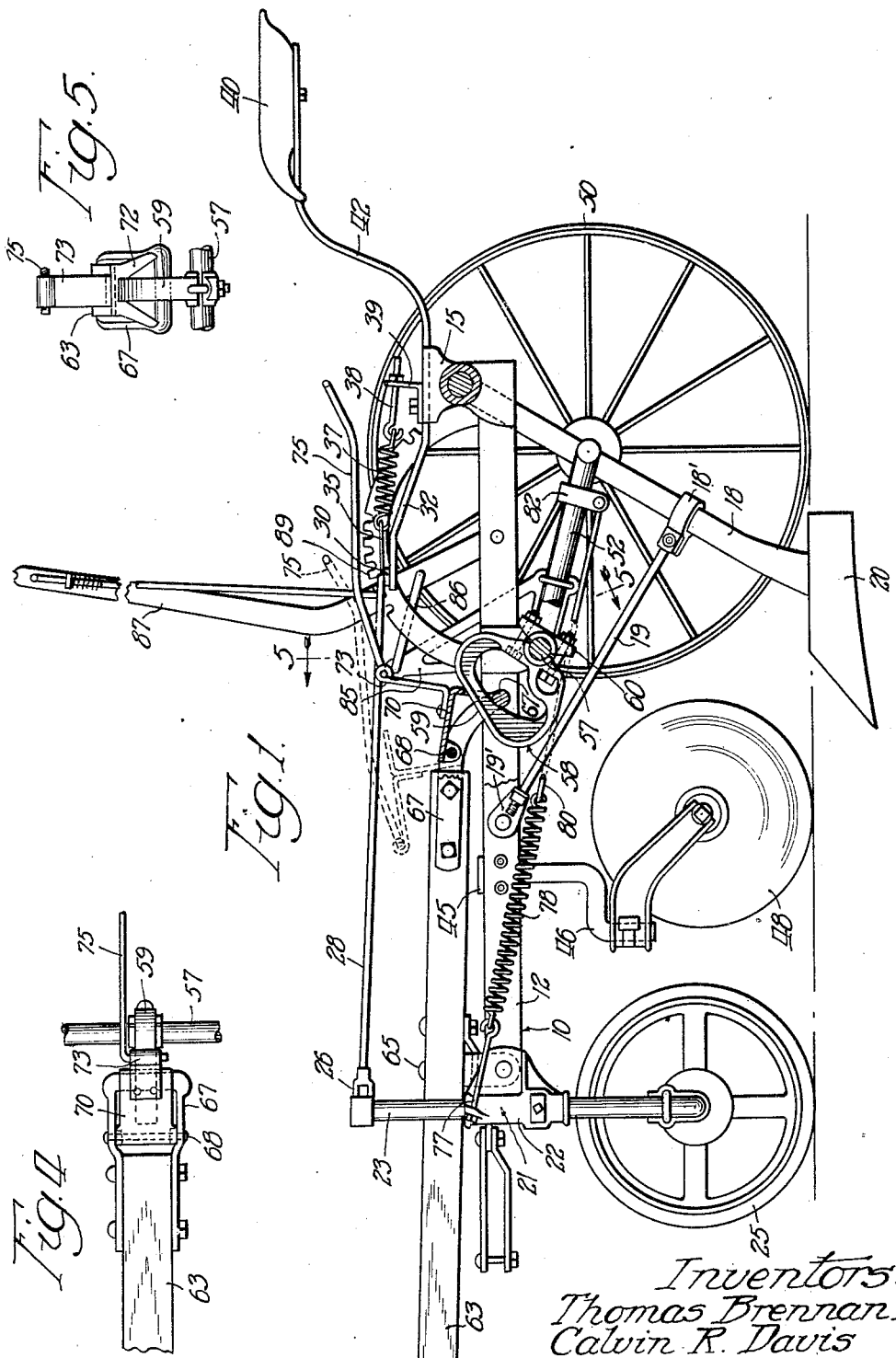

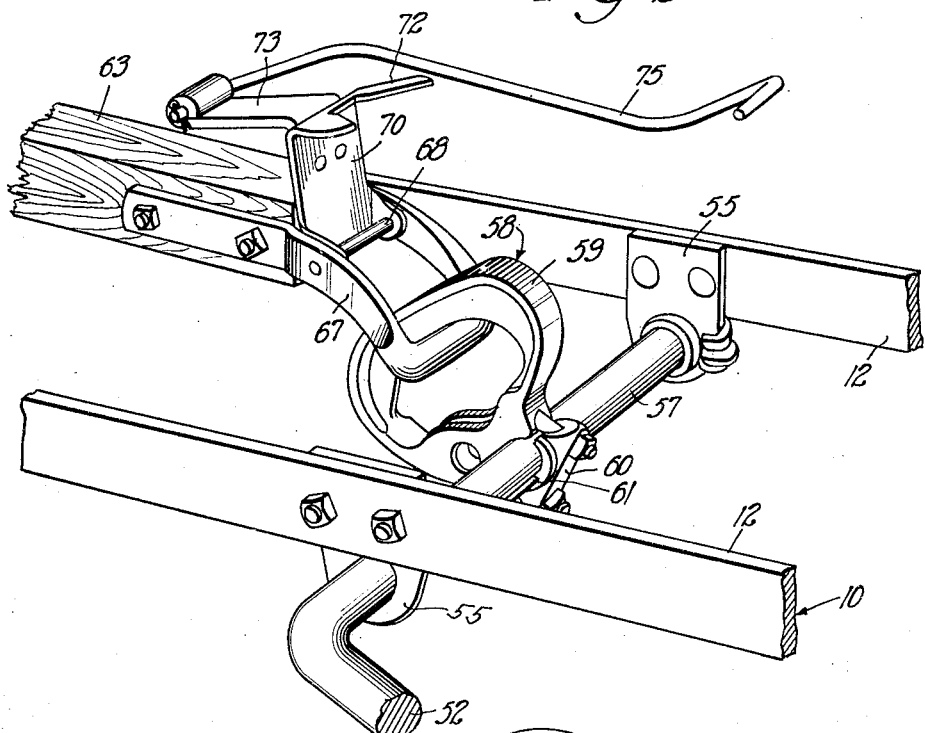
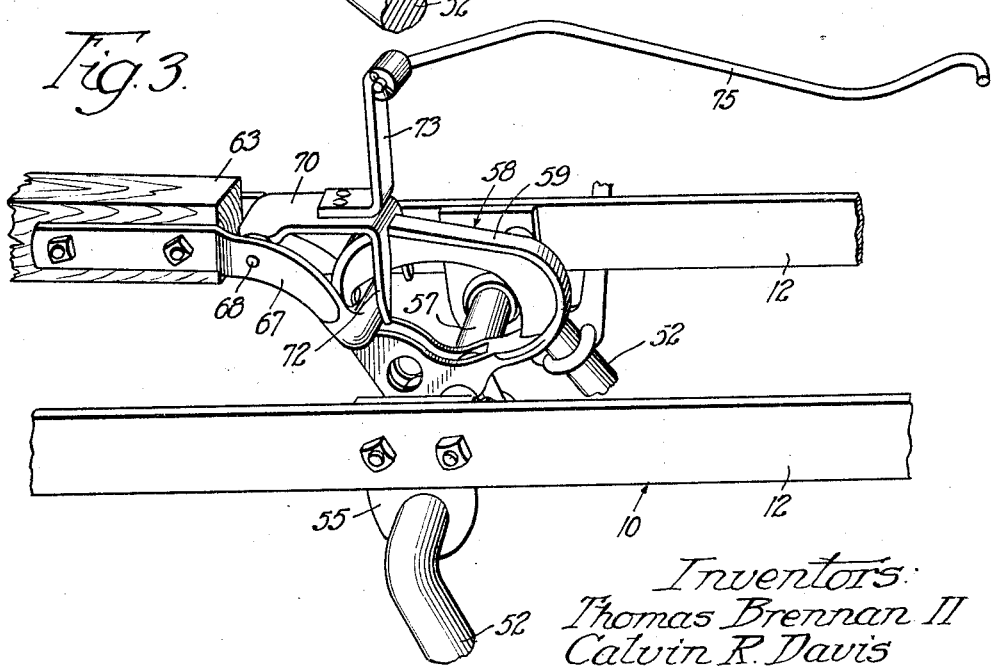

1,840,018

UNITED STATES PATENT OFFICE

THOMAS BRENNAN, 2D, AND CALVIN R. DAVIS, OF ROCKFORD, ILLINOIS, ASSIGNORS TO J. I. CASE COMPANY, OF RACINE, WISCONSIN, A CORPORATION OF WISCONSIN

AGRICULTURAL IMPLEMENT

Application filed March 14, 1930. Serial No. 435,809.

Our invention relates broadly to agricultural implements and has to do more particularly with devices known as beet pullers. An object of our invention is to provide a device having a new and improved pole lock whereby the hitching pole may be locked relative to the frame of the device when the latter is in both operative and inoperative condition.

A further object is to provide such a device which will be simple in construction, certain in operation and rugged.

Various other objects and advantages will become apparent to those skilled in the art as the description proceeds.

Referring now to the drawings forming part of the specification and illustrating a preferred embodiment of our invention:—

Fig. 1 is a longitudinal sectional view of a device embodying our invention, most of the parts being shown in elevation;

Fig. 2 is a fragmentary perspective view on an enlarged scale of our improved pole lock;

Fig. 3 is a similar view of the same, in a different position;

Fig. 4 is a top plan view of a portion of the pole lock, and

Fig. 5 is a sectional view taken substantially on the line 5—5 of Figure 1.

In the preferred embodiment illustrated, the numeral 10 represents a frame comprising a pair of substantially parallel side bars 12—12 connected by suitable means including a bearing 15 journaling a U-shaped yoke 18. This yoke carries adjacent the lower extremities of its legs a pair of plates 20 which are adapted to penetrate the ground, when adjusted for such operation, for the digging up of beets or the like. Mounted on each leg of the yoke 18 is a sleeve 18' to which is pivoted a rod 19 which, in turn, is threaded into a bracket 19' which is pivotally secured to one of the frame members 12. The elevation of the digging plates 20 may be adjusted by shifting the sleeves 18' longitudinally of the legs of the yoke 18.

The bars 12 are connected at their forward end by means of a suitable bracket 21 which includes sleeve portions 22 journaling a pair of steering columns 23, to the lower ends of which are journaled steering wheels 25. The upper end of each of the columns 23 carries an ear 26 to which is secured a rod 28, the other end of which is secured to a foot steering member 30. This foot member is pivoted adjacent its midpoint to a bracket 32 which, in turn, is secured to the member 15. A substantially V-shaped member 35 is perforated adjacent the ends of the legs of the V, the rods 28 passing through these perforations so as to secure the member 35 to the foot member 30 while the vertex of the V is perforated to form an eye for receiving a helical tension spring 37. The other end of this spring is secured to a hook 38 attached to a bracket 39 which in turn may be mounted on the member 15. A seat 40 is mounted on a bracket 42 which conveniently may be a continuation of the bracket 32, and it will be apparent that a person sitting in the seat 40 may control the steering wheels 25 by means of his feet disposed on the laterally projecting arms of the foot piece 30 while the spring 37 will tend to maintain this foot piece in such a position that the steering wheels will tend to guide the device in a substantially straightforward direction.

Secured to each of the frame members 12 is a suitable bearing 45 in which is rotatably journaled an adjustable arm or bracket 46 carrying a disk 48.

A pair of wheels 50 is rotatably journaled upon a U-shaped axle rod 52 which is journaled in brackets 55 mounted on the frame members 12. The cross portion 57 of the U-bar 52 extends through a pole locking member indicated generally at 58 which comprises a loop member 59, preferably a casting, to which is secured as by means of bolts, and nuts or the like a co-operating member 60, the member being keyed as at 61 to the U-member 57.

A hitch is provided for the device by means of a tongue 63 which is pivoted to the frame as at 65, this tongue carrying a U-shaped bracket 67 which, as best shown in Figures 2 and 3, preferably is curved downwardly, and as shown in Figures 4 and 5, is more than large enough to receive the loop 59 of the lock 58, so as normally to permit angling of the tongue with respect to the frame when the former is unlocked. A pin 68 connecting the sides of the U-shaped bracket 67 serves as a pintle for a locking member 70 which has laterally extending bifurcations 72, and extending oppositely from the bifurcations 72 is a loop member 73 in which is journaled a manipulating member 75.

Secured to each of the sleeves 22 is a hook 77 to which is connected a helical tension spring 78 which in turn is connected to a hook 80 pivoted to sleeves 82, these sleeves being adjustably secured upon the legs of the U-shaped axle 52.

The axle 52 may be provided with any suitable means for adjusting the elevation of the wheels 50, which may include a bracket 85 connected as by means of a link 86 to a suitable hand lever 87, the latter being pivoted at its lower end to one of the bars 12 and adjustably securable in various positions by means of a dog engageable with an arcuate rack 89.

It will be seen that when the locking device 70 is out of operative relation with the loop 58 as shown in Fig. 2, the tongue 63 may be angled relative to the frame in view of the play between the U-member 67 and the loop 59. However, when it is desired to make the hitch absolutely rigid with respect to the frame, the locking member 70 is arranged as shown in Figures 3 and 5 with the bifurcated member 72 engaging the loop 59. It also will be apparent that such a rigid connection may be made regardless of the elevation of the digging members 20, since the loop 59 will be engageable by the bifurcated lock 72 for any position of adjustment of the wheels. Obviously, adjustment of the wheels 50 in a vertical plane by means of the lever 87 will have the same effect to vary the relation of the digging members to the ground surface as if the digging members 20 were vertically adjusted.

It will be seen that by providing the locking means 58 on the axle 57 a particularly simple and economical construction is provided, eliminating the necessity for special means mounting the tongue-locking device.

Many modifications and variations of our invention will doubtless occur to those skilled in the art without departing from the spirit of our invention. Hence, we do not wish to be limited to the particular form shown or uses mentioned except as set forth in the appended claims, which are to be interpreted as broadly as is consistent with the state of the art.

We claim as our invention:

1. In a device of the class described, a frame carrying a digging member, a hitching member pivoted to said frame, an axle journaled on said frame and rotatably carrying a pair of wheels, said axle being adjustable so as to vary the elevation of said frame from the ground, means connecting said hitching member to said axle so as normally to permit angling of said hitching member relative to said frame, and means optionally locking said hitching member to said axle for preventing angling of said hitching member relative to said frame in a plurality of positions of elevation of said frame.

2. In a device of the class described, a frame carrying a digging member, a hitching member pivoted to said frame, an axle journaled on said frame and rotatably carrying a pair of wheels, said axle being adjustable so as to vary the elevation of said frame from the ground, means connecting said hitching member to said axle so as normally to permit angling of said hitching member relative to said frame, and means optionally locking said hitching member to said axle for preventing angling of said hitching member relative to said frame while permitting elevation of said frame.

3. In a device of the class described, a frame carrying a digging member, a hitching member pivoted to said frame, means for adjusting the elevation of said digging member relative to the surface over which the device is traveling, means comprising a pair of interengaging loops connecting said adjusting means to said hitching member so as normally to permit angling of said hitching member relative to said frame, and means on said hitching member adapted to straddle the loop on said adjusting means so as to prevent angling of said hitching member relative to said frame in any position of adjustment of said digging member.

4. In a device of the class described, a frame carrying a digging member, a hitching member pivoted to said frame, an axle journaled on said frame and rotatably carrying a pair of wheels, a loop mounted on said axle, a second loop mounted on said hitching member and interengaging with said first-mentioned loop so as normally to permit angling of said hitching member relative to the frame, and means for locking said loops in any position of adjustment of said wheels so as to prevent angling of said hitching member.

5. In a device of the class described, a frame carrying a digging member, a hitching member pivoted to said frame, an axle journaled on said frame and rotatably carrying a pair of wheels, a loop mounted on said axle, a second loop mounted on said hitching member and interengaging with said first-mentioned loop so as normally to permit angling of said hitching member relative to the frame, and means carried by said second loop and adapted to straddle said first loop to prevent angling of said hitching member in any position of adjustment of said wheels.

6. In a device of the class described, a frame carrying a digging member, a hitching member pivoted to said frame, an axle on said frame and rotatably carrying a pair of wheels, means permitting limited angling of said hitching member relative to the frame, said means comprising a pair of co-operating members mounted on said hitching member and on said axle respectively, and means for optionally locking said co-operating members to prevent angling of said hitching member.

7. In a device of the class described, a frame carrying a digging member, a hitching member pivoted to said frame, an axle on said frame and rotatably carrying a pair of wheels, means permitting limited angling of said hitching member relative to the frame, said means comprising a pair of co-operating members mounted on said hitching member and on said axle respectively, the co-operating member which is mounted on said axle being rotatable therewith, and means for optionally locking said co-operating members to prevent angling of said hitching member.

Rockford, Illinois, March 11, 1930.

THOMAS BRENNAN, II.
CALVIN ROSCOE DAVIS.